(12) United States Patent
Sol

(10) Patent No.: US 6,906,287 B2
(45) Date of Patent: Jun. 14, 2005

(54) CONNECTOR STRUCTURE FOR BUS BARS IN HEATABLE VEHICLE WINDOW

(75) Inventor: Jean-Marc Sol, Thionville (FR)

(73) Assignee: Centre Luxembourgeois de Recherches pour le Verre et la Ceramique S.A. (C.R.V.C.), Grand Duchy (LU)

( * ) Notice: Subject to any disclaimer, the term of this patent is extended or adjusted under 35 U.S.C. 154(b) by 470 days.

(21) Appl. No.: 09/946,955

(22) Filed: Sep. 6, 2001

(65) Prior Publication Data

US 2003/0042239 A1 Mar. 6, 2003

(51) Int. Cl.[7] .................................................. B60L 1/02
(52) U.S. Cl. .................... 219/203; 219/522; 219/541; 219/219; 15/250.05
(58) Field of Search ................................ 219/203, 522, 219/541, 219, 543, 544; 428/423.1, 426; 15/250.05; 52/171.2; 29/611, 620, 621

(56) References Cited

U.S. PATENT DOCUMENTS

| | | | |
|---|---|---|---|
| 3,729,616 A | | 4/1973 | Gruss et al. |
| 3,790,752 A | * | 2/1974 | Boaz et al. .................. 219/522 |
| 3,794,809 A | | 2/1974 | Beck et al. |
| 3,893,234 A | | 7/1975 | Levin |
| 4,668,270 A | | 5/1987 | Ramus |
| 4,782,216 A | | 11/1988 | Woodard |
| 4,820,902 A | | 4/1989 | Gillery |
| 4,894,513 A | | 1/1990 | Koontz |
| 5,023,403 A | * | 6/1991 | Eckardt et al. ............. 219/203 |
| 5,213,828 A | | 5/1993 | Winter et al. |
| 5,229,205 A | | 7/1993 | Nietering |
| 5,434,384 A | | 7/1995 | Koontz |
| 5,914,178 A | * | 6/1999 | Sol et al. .................. 428/423.1 |
| 6,137,086 A | | 10/2000 | Williams, Jr. |
| 6,261,672 B1 | | 7/2001 | de Paoli |
| 6,492,619 B1 | * | 12/2002 | Sol ............................ 219/203 |
| 6,559,419 B1 | * | 5/2003 | Sol et al. .................... 219/203 |
| 6,625,875 B2 | * | 9/2003 | Sol ............................. 29/621 |

FOREIGN PATENT DOCUMENTS

| | | |
|---|---|---|
| EP | 0 524 537 | 1/1993 |
| EP | 0 749 266 | 12/1996 |

* cited by examiner

Primary Examiner—Fadi H. Dahbour
(74) Attorney, Agent, or Firm—Nixon & Vanderhye P.C.

(57) ABSTRACT

Opposing substrates of a vehicle window are laminated to one another using a polymer inclusive interlayer which has a notch or cut-out portion defined therein. Following lamination, at least one bus bar(s) supported by one of the substrates is exposed in this notch or cut-out portion of the interlayer. Then, an external connector may be electrically connected to the bus bar(s) at a location between the opposed substrates, by sliding a portion of the connector into a gap between the two laminated substrates at a location where the bus bar(s) is exposed due to the notch or cut-out in the interlayer. Because the connector can be electrically connected to the bus bar(s) after the lamination process, various techniques (e.g., nipper rolls, vacuum apparatus, etc.) may be used to laminate the substrates to one another prior to this electrical connection.

39 Claims, 6 Drawing Sheets

CONNECTOR STRUCTURE FOR BUS BARS IN HEATABLE VEHICLE WINDOW

This invention relates to a laminated vehicle window made in a manner so as to enable a connector for supplying electric current to bus bars in a heatable vehicle window to be easily connected to the window following lamination.

BACKGROUND OF THE INVENTION

Heatable vehicle windows are known in the art. For example, see U.S. Pat. Nos. 5,434,384 and 4,782,216, the disclosures of which are hereby incorporated herein by reference. Heatable vehicle windows typically include first and second conductive bus bars in electrical communication with a transparent conductive coating including an electroconductive layer. The electroconductive layer generates heat when electric current passes therethrough. Current is typically supplied to the electroconductive layer via a pair of bus bars. In such a manner, snow and ice may be melted from vehicle windows such as windshields, backlites, sidelites, and/or the like. Windows may also be defogged in such a manner.

FIG. 1 is a side cross-sectional view of a peripheral portion of a conventional heatable window at a point where an external connection is made. The laminated window includes glass substrate 1, glass substrate 2, conductive bus bar 3 provided on the interior surface of substrate 2, a polymer inclusive interlayer (e.g., of PVB) 4 sandwiched between substrates 1 and 2, and external electrical connector 5 which is electrically connected to bus bar 3 via conductive solder 6. In manufacturing the vehicle windshield of FIG. 1, conductive connector 5 is adhered to bus bar 3 via solder 6 before substrates 1 and 2 are laminated to one another via interlayer 4. In other words, connector 5 is attached to bus bar 3 before interlayer 4 is placed thereover. After interlayer 4 is placed over connector 5 and solder 6, the substrates 1 and 2 are laminated to one another via interlayer 4.

Unfortunately, it may often be undesirable to adhere connector 5 to bus bar 3 before lamination of the two substrates to one another. For example, when this is the case, a vacuum-type lamination apparatus must often be used to laminate substrates 1 and 2 together. This can effectively limit the way in which lamination can be conducted, thereby leading to potential increases in capital expenditure.

In view of the above, it will be apparent to those skilled in the art that there exists a need for a more efficient bus bar connector interface structure in a laminated window, and corresponding method of manufacturing the overall vehicle window.

SUMMARY OF THE INVENTION

An object of this invention is to provide a terminal connector which may be electrically connected to bus bar(s) in an efficient manner during and/or after manufacture of a vehicle window. In certain example embodiments, the terminal connector is connected to the bus bar(s) following lamination.

Another object of this invention is to laminate opposing substrates of a vehicle window to one another using a polymer inclusive interlayer which has a notch or cut-out portion defined therein. At least one bus bar(s) is exposed in this notch or cut-out portion of the interlayer. Following lamination of the two substrates, a connector may be electrically connected to the bus bar(s) at a location between the opposed substrates, by sliding a portion of the connector into a gap between the two laminated substrates at a location where the bus bar(s) is exposed due to the notch or cut-out in the interlayer. Because the connector can be electrically connected to the bus bar(s) after the lamination process, various techniques (e.g., nipper rolls, vacuum apparatus, etc.) may be used to laminate the substrates to one another prior to this electrical connection.

Another object of this invention is to fulfill one or more of the above-listed objects and/or needs.

Generally speaking, certain example embodiments of this invention fulfill one or more of the above listed needs and/or objects by providing a method of making a heatable vehicle window, the method comprising:

forming at least one heatable electroconductive layer so as to be supported by a first substrate;

forming at least first and second electroconductive bus bars;

laminating the first substrate to a second substrate via a polymer inclusive interlayer so that the heatable electroconductive layer and the bus bars are at least partially provided between the first and second substrates, the interlayer having at least one notch or cut-out defined therein; and after said laminating, inserting at least a portion of a terminal connector into a gap located between the substrates in order to electrically connect the terminal connector to at least one of the bus bars at an area corresponding to said at least one notch or cut-out defined in the interlayer.

Certain other embodiments of this invention fulfill one or more of the above-listed needs and/or objects by providing a heatable vehicle window comprising:

first and second substrates laminated to one another via a polymer inclusive interlayer, wherein a heatable layer and at least first and second conductive bus bars are provided between the substrates;

wherein a notch or cut-out is defined in a peripheral portion of said polymer inclusive interlayer; and wherein a position of said notch or cut-out defined in said interlayer corresponds to a position of a terminal portion of at least one of said bus bars so that following lamination of the first and second substrates to one another said terminal portion of said at least one bus bar is exposed and accessible via a gap provided between the first and second substrates.

This invention will now be described with respect to certain example embodiments thereof, as illustrated in the following drawings.

IN THE DRAWINGS

DETAILED DESCRIPTION OF CERTAIN EXEMPLARY EMBODIMENTS OF THE INVENTION

Figure 1:
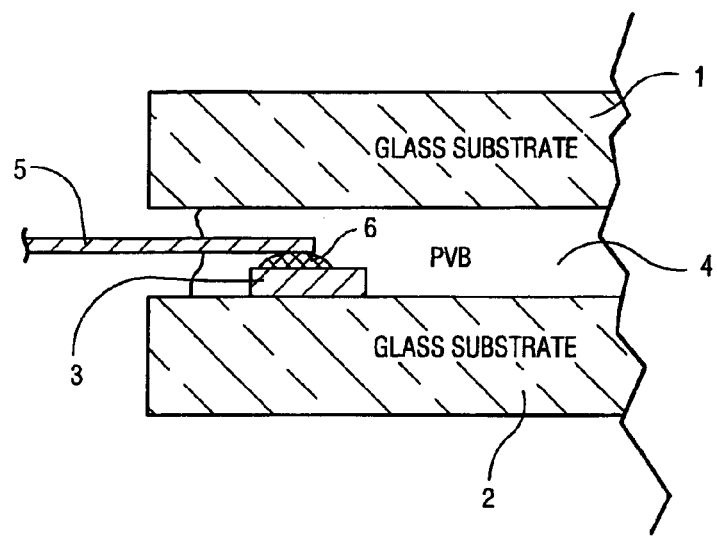
FIG. 1 is a side cross-sectional view of a peripheral portion of a conventional vehicle windshield.

Referring now more particularly to the accompanying drawings in which like reference numerals indicate like parts or layers throughout the several views.

The instant invention involves laminating first and second opposing substrates to one another via a polymer inclusive interlayer.

In certain preferred embodiments, the interlayer has at least one notch or cut-out defined therein proximate a periphery thereof. This at least one notch or cut-out defined in the interlayer is positioned at terminal portion(s) of bus bars during lamination of the opposing substrates, so that following lamination the terminal portions of the bus bars are exposed (i.e., not covered by the interlayer) in a gap provided between the opposing substrates. Thus, an external terminal connector may be at least partially inserted into a peripheral area of the vehicle window, following lamination, into the gap(s) between the opposing substrates so that an electrical connection can be made between the connector and the exposed terminal portion(s) of the bus bars. Because the electrical connection with the bus bars can be made after lamination, the manufacturer has more flexibility with regard to what type of lamination process (e.g., nipper roll process, vacuum process, etc.) may be used.

Figure 7:
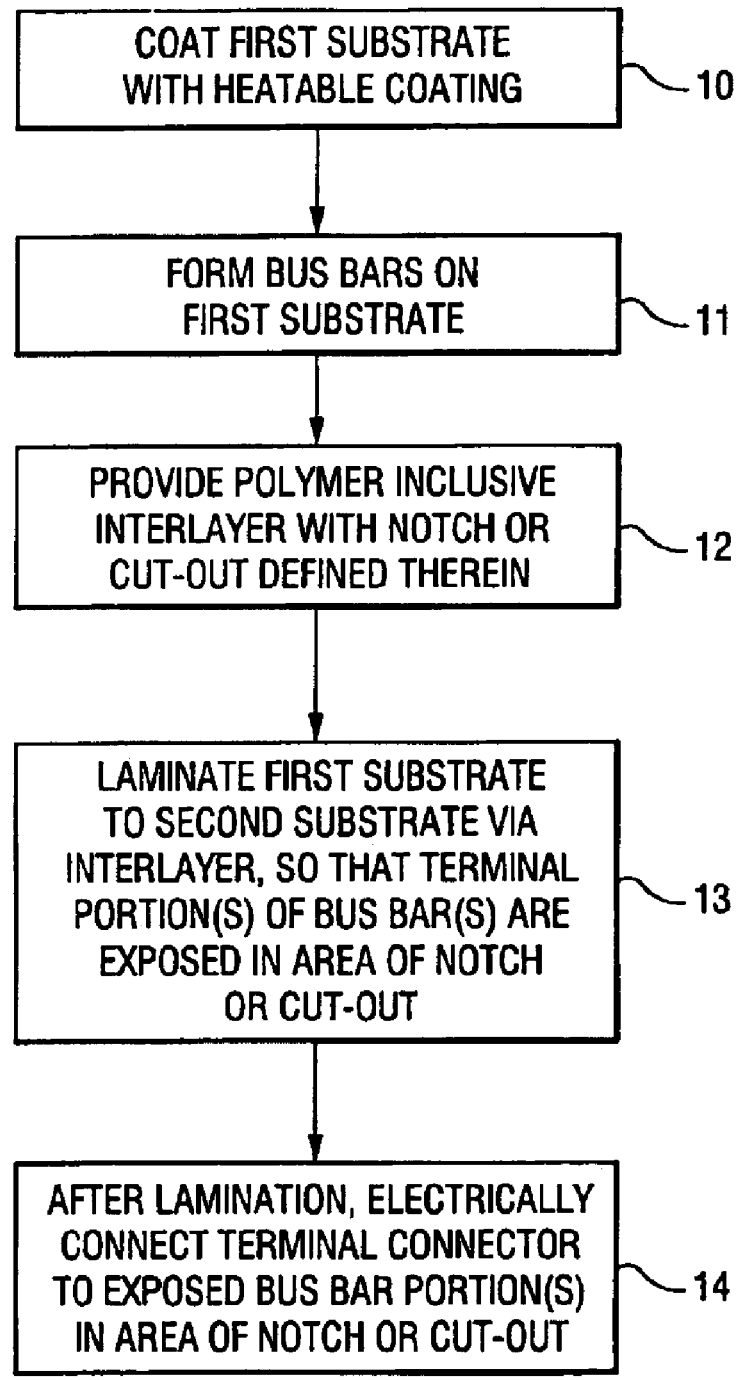
FIG. 7 is a flow chart illustrating certain steps carried out during the method of manufacturing a vehicle window according to an embodiment of this invention.

FIG. 7 is a flow chart illustrating certain example steps taken during the process of manufacturing a vehicle window (e.g., windshield, backlite, or sidelite) according to an embodiment of this invention. This embodiment is not intended to be limiting, but is provided for purposes of example only. Initially, first and second substrates 1 and 2 are provided. The substrates may be of glass, or any other suitable material.

Figure 2:
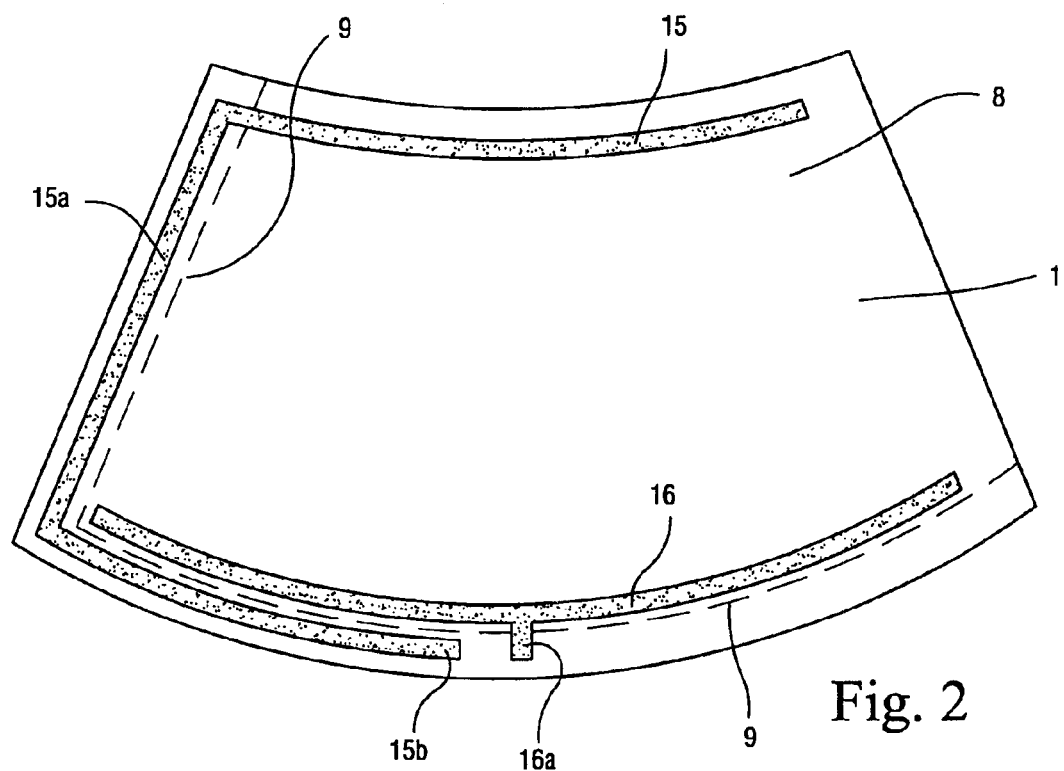
FIG. 2 is a top plan view of a substrate supporting a conductive coating, and bus bar arrangement provided thereon.

Referring to FIGS. 2 and 7, first substrate 1 is coated with a heatable coating 8 including at least one electroconductive layer (see step 10 in FIG. 7). Coating 8 may be of a single electroconductive layer (e.g., silver or ITO), or instead may be a multi-layered coating including one or more conductive layers and optionally one or more dielectric layers. For example, any of the coatings disclosed in co-pending Ser. No. 09/832,335 may be utilized as coating 8, the disclosure of this co-pending application being incorporated herein by reference. After substantially an entire major surface of substrate 1 has been coated with heatable coating 8, the coating is deleted in certain areas as illustrated by deletion line(s) 9 in FIG. 2. In the FIG. 2 embodiment, coating 8 is deleted along a left-hand edge of substrate 1, as well as along a bottom edge of substrate 1 (coating 8 remains in other areas of the substrate, i.e., coating 8 remains on at least about 70% of the surface area of substrate 1, more preferably at least about 90%).

Following deletion 9 of certain portions of coating 8, at least two conductive bus bars 15 and 16 are formed on substrate 1 (see step 11 in FIG. 7). As shown in FIG. 2, top bus bar 15 is formed along a top edge or area of the substrate over heatable coating 8, and also includes an extension portion 15a formed on a peripheral area of substrate 1 where coating 8 has been deleted. Extension portion 15a of top bus bar 15 extends down at least one edge of substrate 1, to a bottom edge of the substrate where terminal end portion 15b of the bus bar is located. Bottom bus bar 16 is formed along a bottom edge or area of the substrate over heatable coating 8, except for terminal end portion 16a which extends onto an area of substrate 1 where coating 8 has been deleted. Bus bars 15 and 16 may be formed on substrate 1 by sputtering, silk-screening, or any other suitable technique. Bus bars 15, 16 may be of or include silver, copper, ITO (indium-tin-oxide), gold, or any other suitable conductive material.

Polymer inclusive interlayer 4 is provided in a shape substantially matched to that of the window, but so as to have at least one notch or cut-out 20 defined in a peripheral portion thereof. Notch or cut-out 20 may be in the shape of a rectangle (see FIGS. 3–4), a triangle, a square, an oval, a semi-circle, or any other suitable shape in different embodiments of this invention. Interlayer 4 is preferably substantially transparent to visible light, and may be of or include polyvinyl butyral (PVB) or any other suitable polymer inclusive material which may be used for lamination (see step 12 in FIG. 7).

Figure 3:
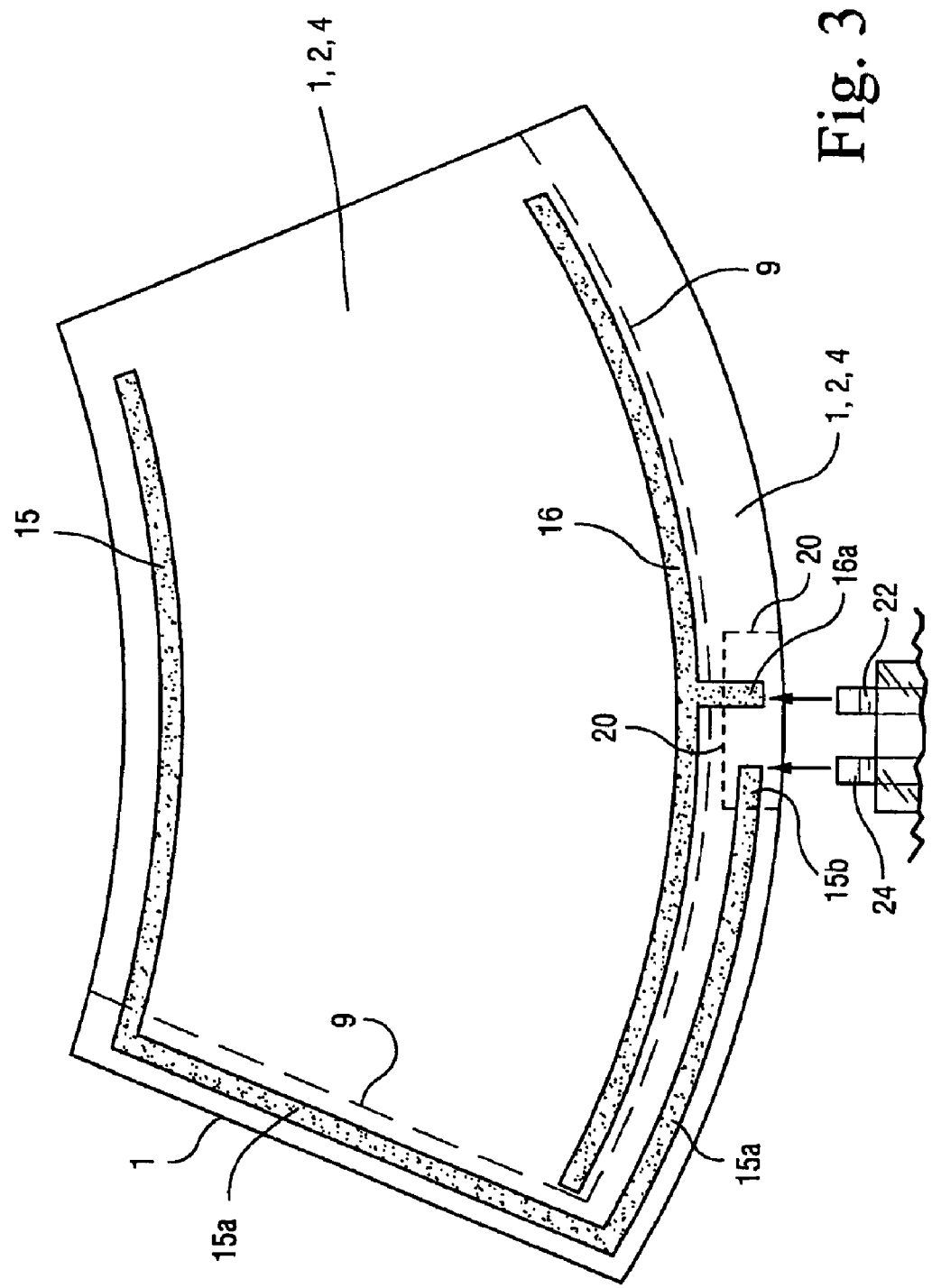
FIG. 3 is a top plan view of a vehicle windshield including the substrate of FIG. 2, after the lamination process, as a terminal connector is being brought toward the windshield for electrical connection to the bus bars.

Now referring to FIGS. 3 and 7, the first substrate 1 with heatable coating 8 and bus bars 15, 16 thereon (see FIG. 2) is then laminated to second substrate 2 via this interlayer 4 having notch or cut-out 20 defined therein (see step 13 in FIG. 7). As specifically shown in FIG. 3, during the lamination process, cut-out or notch 20 in interlayer 4 is aligned with terminal portions 15b and 16a of the respective bus bars, so that following lamination these bus bar terminal portions 15b and 16a are exposed in a gap 30 between substrates 1, 2 (i.e., the bus bar terminal portions 15b and 16a are not covered by interlayer 4). The shape of the cut-out or notch 20 defines the shape of gap 30 provided between the substrates.

Figure 4:
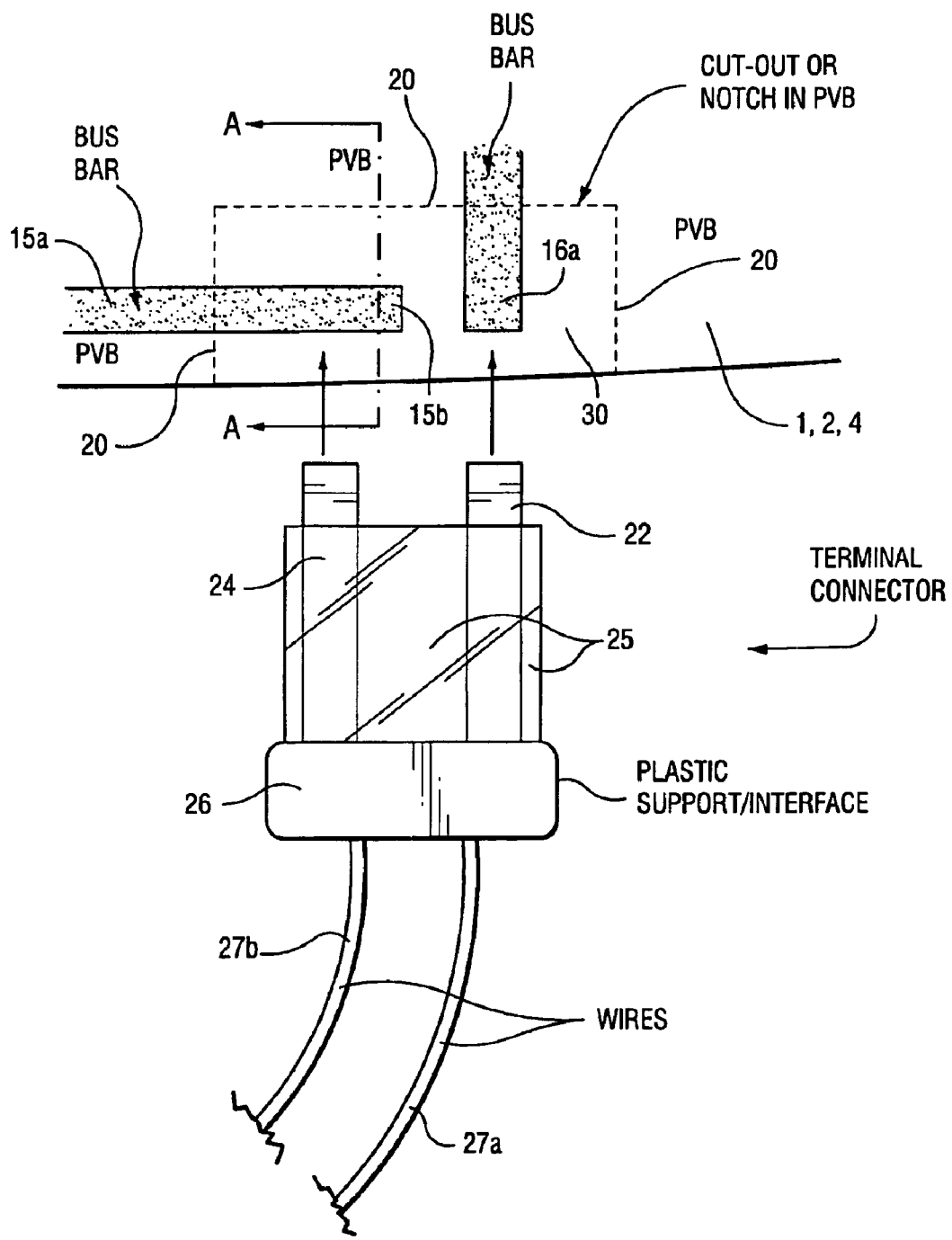
FIG. 4 is a schematic diagram illustrating how the terminal connector is electrically connected to the bus bars of the windshield of FIG. 3.

Referring now to FIGS. 3, 4 and 7, following lamination, a terminal connector is at least partially inserted into a gap formed between substrates 1, 2 in the area of notch or cut-out 20 in order to electrically connect the same to terminal portions 15b and 16a of the bus bars (see step 14 in FIG. 7). As shown in FIG. 4, this external terminal connector includes first elongated conductor 22 and second elongated conductor 24 which are to be electrically connected to the respective terminal portions 16a and 15b of the bus bars. Conductors 22 and 24 may be of copper foil, or any other suitable electrically conductive material in different embodiments of this invention. Conductors 22 and 24 are flexible in certain preferred embodiments of this invention, but need not be flexible in all embodiments. Still referring to FIG. 4, flexible plastic insulating sheet 25 (e.g., of Kapton or any other suitable polymer inclusive material) is provided around significant portions of conductors 22, 24 in order to support the same and insulate the conductors 22, 24 from one another. Flexible plastic sheet 25 may be opaque or transparent in different embodiments of this invention.

Plastic support or interface 26 supports both sheet 25 and conductors 22, 24, and enables electrically conductive wires 27a and 27b to be electrically connected/interfaced to connectors 22 and 24, respectively. After connector 22 is electrically connected to bus bar 16 and connector 24 is electrically connected to bus bar 15, wires 27a and 27b supply power so as to enable the bus bars to apply a voltage across heatable coating 8 so as to heat the same.

Figure 5:
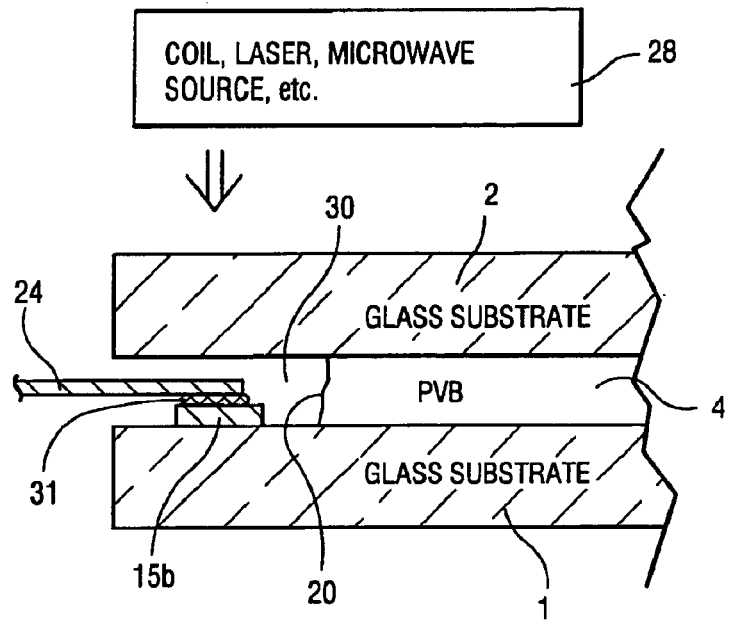
FIG. 5 is a side cross-sectional view of a peripheral portion of the vehicle windshield of FIG. 3, after the terminal connector has been electrically connected to the bus bars according to an embodiment of this invention.

FIG. 5 is a side cross-sectional view illustrating one way that conductor 24 may be connected to bus bar 15 according to an example embodiment of this invention (taken along section line A—A in FIG. 4). After substrates 1 and 2 have been laminated to one another via interlayer 4 with notch/cut-out 20 defined therein, conductors 22, 24 are at least partially inserted into gap 30 between the substrates at an area where notch(es) 20 is formed, over the respective terminal portions 15b, 16a of the bus bars. Solder 31, provided between the conductors and the respective terminal portions of the bus bars, is then heated so as to electrically connect the conductors 22, 24 to the respective bus bars 16, 15. Solder 31 may be heated (see source 28 in FIG. 5) by a laser, infra red (IR) radiation, convection heat, microwaves, ultraviolet light, induction heating, or any other suitable technique. Optionally, after the conductors 22, 24 have been soldered to the respective bus bars 16, 15, a polymer inclusive sealing material (not shown) may be inserted into gap 30 so as to cover and protect these electrically connections.

When induction heating is used, for example, to heat solder 31, the solder may be heated in a non-contacting manner using an alternating magnetic field. Induction heating occurs when an electrically conducting object (e.g., solder) is placed in a varying electromagnetic field, and heating occurs as a function of the resistivity of the object being heated. A coil 28 or any other suitable structure may be used to generate the electromagnetic field, which is directed toward the solder in order to heat it for bonding the conductor(s) to the bus bar(s).

Figure 6:
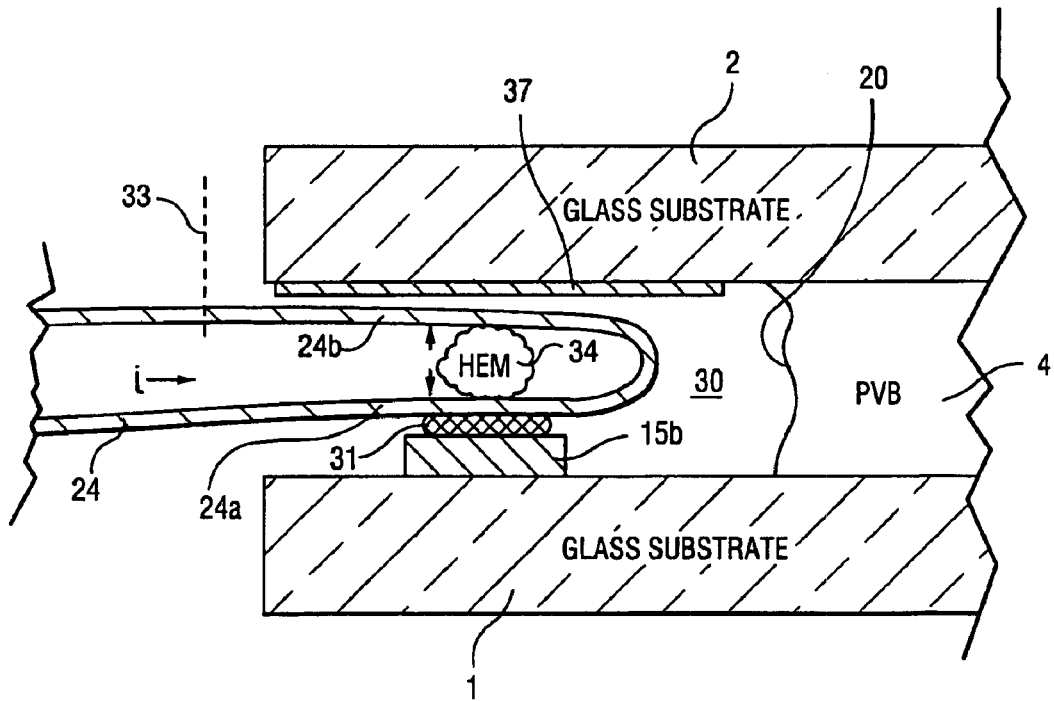
FIG. 6 is a side cross-sectional view of a peripheral portion of the vehicle windshield of FIG. 3, after the terminal connector has been electrically connected to the bus bars according to another embodiment of this invention.

FIG. 6 illustrates an alternative technique for attaching conductors 22, 24 to bus bars 16, 15, respectively. Following lamination of substrates 1 and 2 to one another via interlayer 4, conductor 24 (and conductor 22) is inserted into gap 30 between the substrates in the area of notch/cut-out 20. According to FIG. 6, the conductor 24 (and/or 22) is bent or flexed over itself (i.e., each conductor 22, 24 at least partially overlaps itself in the gap 30) so that first and second approximately parallel overlapping portions 24a, 24b which are connected to one another are inserted into gap 30. Electrically conductive solder 31 is provided between the bottom portion 24a of the conductor and terminal portion 15b of bus bar 15. Then, electric current (i) is run through conductor 24 in order to heat solder 31 and cause bottom portion 24a of the conductor to be electrically connected to terminal portion 15b of bus bar 15 via solder 31. After this electrical connection has been made, the distal end of portion 24b of the connector may be cut off at cutting line 33.

Optionally, a heat expanding material (HEM) 34 may be provided between and in contact with overlapping portions 24a and 24b of conductor 24 in an area over bus bar 15. When electric current is run through conductor 24, the heat generated by the conductor 24 causes both 1) heat expandable material 34 to expand outwardly, and 2) solder 31 to soften/melt. Thus, this heat induced expansion of material 34 exerts a downward pressure on portion 24a of conductor 24 thereby forcing portion 24a toward bus bar 15 so as to enable it to be more firmly connected thereto via solder 31. In certain embodiments of this invention, material 34 expands at a first temperature T1, and solder 31 flows/melts at a second temperature T1+x (where x is a positive number), so that material 34 expands before solder 31 flows and electrically connects the conductor to the bus bar.

Optionally, an opaque shielding layer(s) 37 may be provided on substrate 2 in order to hide the electrical connection of the conductor(s) to the bus bar(s) in gap 30. Layer 37 may be black frit paint, or any other suitable material in different embodiments of this invention.

Figure 8:
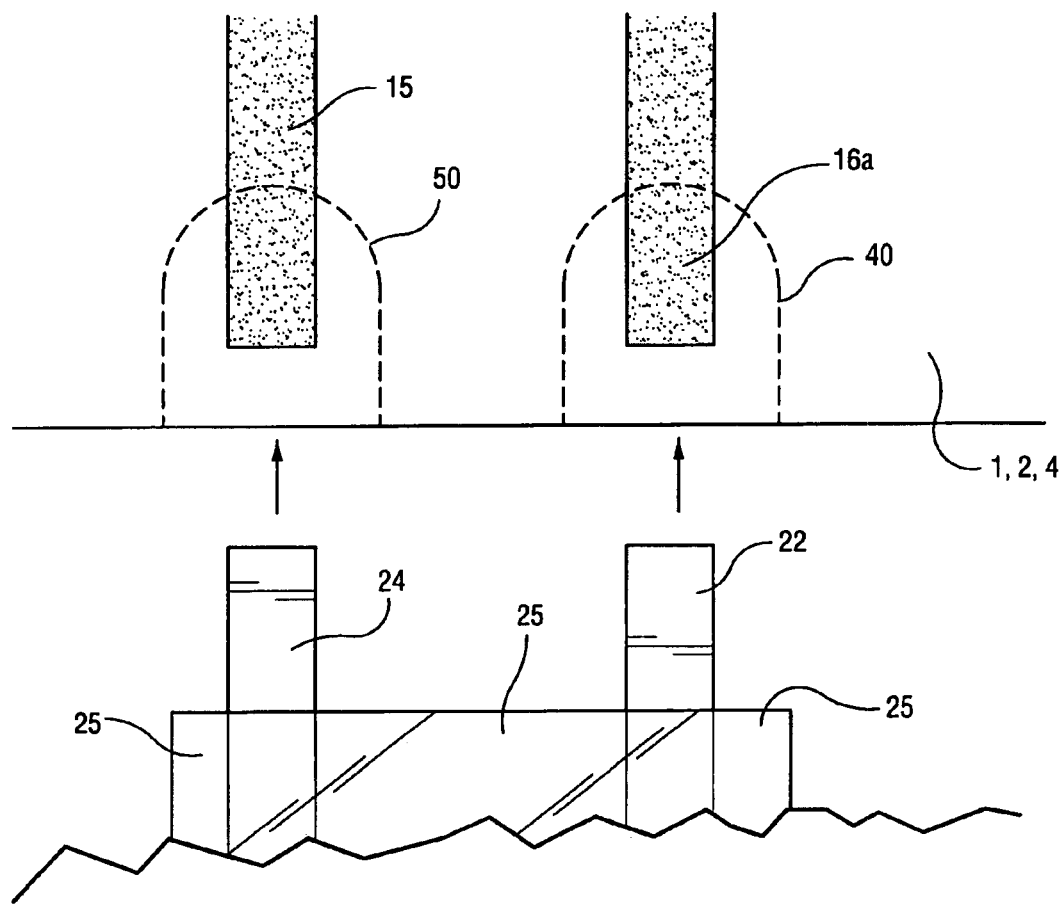
FIG. 8 is an exploded top view, where cut-outs or notches are shown in broken lines, of another embodiment of this invention illustrating how the connector can be electrically connected to the bus bars when a pair of such cut-outs or notches are provided in the interlayer.

The aforesaid embodiments illustrate a single notch or cut-out 20 defined in interlayer 4 that receives both conductors 22, 24 of the terminal connector. However, it will be recognized by those skilled in the art that in other embodiments of this invention first and second different notches or cut-outs may be provided in interlayer 4 (e.g., one notch or cut-out 20 for each terminal portion of a bus bar). For example, as shown in FIG. 8, a first cut-out or notch 40 in interlayer 4 may define a gap 30 that receives conductor 22 for electrical connection to bus bar 16, while a second separate and distinct cut-out or notch 50 in the interlayer 4 defines another gap 30 that receives the other conductor 24 for electrical connection to the other bus bar 15. In such alternative embodiments, the first and second different notches 40, 50 may be adjacent to one another, or significantly spaced apart so as to be located at different areas of the window.

In other embodiments of this invention, the technology discussed above for connecting conductor(s) 22, 24 to bus bar(s) may instead be used to connect conductor(s) 22 and/or 24 to conductive structures such as antennas (e.g., car radio antennas, cell phone antennas, etc.) on the inside of a laminate (see the method of FIGS. 4–8). In such cases, a terminal portion/end of the conductive structure (e.g., antenna) is represented by 15b and/or 16a in the drawings, and any of the above methods/techniques can be used to connect a lead/conductor 22 and/or 24 thereto.

Once given the above disclosure, many other features, modifications, and improvements will become apparent to the skilled artisan. Such other features, modifications, and improvements are therefore considered to be a part of this invention, the scope of which is to be determined by the following claims and equivalents thereof.

What is claimed is:

1. A method of making a heatable vehicle window, the method comprising:
    forming at least one heatable electroconductive layer so as to be supported by a first substrate;
    forming at least first and second electroconductive bus bars;
    laminating the first substrate to a second substrate via a polymer inclusive interlayer so that the heatable electroconductive layer and the bus bars are at least partially provided between the first and second substrates, the interlayer having at least one notch or cut-out defined therein; and
    after said laminating, inserting at least a portion of a terminal connector into a gap located between the substrates in order to electrically connect the terminal connector to at least one of the bus bars at an area corresponding to said at least one notch or cut-out defined in the interlayer.

2. The method of claim 1, further comprising applying voltage to the electroconductive layer via the bus bars and the terminal connector so as to heat at least a portion of the window.

3. The method of claim 1, wherein the first bus bar comprises a top bus bar and the second bus bar comprises a bottom bus bar.

4. The method of claim 1, wherein the terminal connector comprises first and second spaced apart conductors, each of said first and second conductors being supported by a flexible plastic insulating sheet.

5. The method of claim 4, wherein the first and second conductors of the terminal connector comprise conductive foil.

6. The method of claim 1, further comprising, after said laminating of the first and second substrates to one another via at least the interlayer, electrically connecting a conductor of the terminal connector to one of the bus bars by soldering in the area corresponding to the notch or cut-out in the interlayer.

7. The method of claim 6, further comprising applying pressure to the conductor during the soldering in order to press the conductor toward said one of the bus bars.

8. The method of claim 6, further comprising causing electric current to flow through the conductor so that the conductor generates heat for helping solder to melt or flow during the soldering.

9. The method of claim 1, wherein said inserting comprises inserting a conductor of the terminal connector into the gap between the substrates, wherein the conductor is shaped so as to at least partially overlap itself in the gap.

10. The method of claim 9, wherein a heat-activated expandable material which expands when subjected to heat of at least a predetermined temperature is located between overlapping portions of the conductor in the gap, so that upon expansion of the expandable material a portion of the conductor of the terminal connector is pressed toward the bus bar to which it is to be electrically connected.

11. The method of claim 1, wherein the interlayer comprises polyvinyl butyral (PVB).

12. The method of claim 1, wherein the interlayer does not contact the terminal connector.

13. The method of claim 1, wherein the interlayer is provided over at least about 90% of the surface area between the substrates.

14. A method of making a heatable vehicle window, the method comprising:
    laminating first and second substrates together via at least a polymer inclusive interlayer, wherein first and second bus bars and a heatable layer are provided at least partially between the substrates; and
    after said laminating, inserting at least a conductor of a terminal connector into a gap between the substrates in order to connect the conductor to one of the bus bars.

15. The method of claim 14, wherein the interlayer has a surface area approximately the same as a surface area of one of the substrates, but the interlayer is not located in the gap between the substrates where the conductor is connected to the one of the bus bars.

16. The method of claim 15, wherein another conductor of the terminal connector is connected to the other one of the bus bars in the gap.

17. The method of claim 15, wherein another conductor of the terminal connector is connected to the other one of the bus bars in another gap provided between the substrates, the interlayer not being present in the another gap.

18. The method of claim 14, further comprising, after said inserting, causing electric current to run through the conductor so that the conductor generates heat in order to activate a bonding material located between the conductor and the one bus bar.

19. The method of claim 14, wherein the conductor of the terminal connector at least partially overlaps itself in the gap.

20. The method of claim 19, further comprising causing electric current to be present in the conductor so that heat generated by the conductor due to the current causes material located between overlapping portions of the conductor in the gap to expand and press a portion of the conductor toward the one of the bus bars.

21. A method of making a beatable vehicle window, the method comprising:
    laminating first and second substrates together via at least a polymer inclusive interlayer having a notch or cut-out defined in a peripheral portion thereof, wherein first and second bus bars and a beatable layer are provided at least partially between the substrates; and
    wherein said laminating is carried out so that a position of the notch or cut-out defined in the interlayer corresponds to a position of a portion of at least the first bus bar so that after said laminating the portion of the first bus bar is exposed and accessible via a gap defined between the first and second substrates.

22. A method of making a vehicle window, the method comprising:
    laminating first and second substrates together via at least an interlayer so that a heatable layer and at least two bus bars are provided between the substrates after said laminating; and
    after said laminating, in order to connect a conductor of a connector to one of the bus bars causing electric current to run through the conductor of the connector so that the current running through the conductor causes the conductor to generate heat that activates a bonding layer and the conductor becomes connected to one of the bus bars via at least the bonding layer.

23. The method of claim 22, wherein the bonding layer comprises solder.

24. The method of claim 22, wherein the interlayer does not contact the bonding layer.

25. The method of claim 22, wherein the conductor is connected to the bus bar in a gap area between the substrates, the gap area being defined by a recess or cut-out in the interlayer.

26. The method of claim 25, wherein the conductor at least partially overlaps itself in the gap area between the substrates.

27. A method of making a vehicle window, the method comprising:
    providing an expandable material between first and second overlapping portions of a conductor;
    providing a bonding layer between the first portion of the conductor and a conductive terminal; and
    electric current in the conductor causing the conductor to generate heat that causes the expandable material to expand and the bonding layer to activate so that the conductor is connected to the terminal via at least the bonding layer.

28. The method of claim 27, wherein the bonding material comprises solder which flows or melts when activated.

29. The method of claim 27, wherein the conductive terminal is a terminal portion of a bus bar of the vehicle window.

30. The method of claim 27, further comprising forming a substantially transparent heatable layer supported by a first of a pair of substrates that are thereafter laminated together via a polymer inclusive interlayer, and
    wherein voltage is applied across the heatable layer via at least the conductor that is in electrical communication with the terminal in order to heat the window.

31. A heatable vehicle window comprising:
    first and second glass substrates laminated to one another via a polymer inclusive interlayer, wherein a heatable layer and at least first and second conductive bus bars are provided between the substrates;

wherein said first and second bus bars are located directly on and contacting the first glass substrate so as to be at least partially located between the first glass substrate and the polymer inclusive interlayer which is adjacent thereto;

wherein a terminal connector is electrically connected to at least one of the bus bars in a gap between the substrates; and wherein said gap is defined by a notch or cut-out in said polymer inclusive interlayer, so that said polymer inclusive interlayer does not cover or contact the terminal connector located in the notch or cut-out.

32. The heatable vehicle window of claim 31, wherein said heatable layer is heated due to current passing therethrough, said current being supplied via said bus bars and said terminal connector.

33. The heatable vehicle window of claim 31, wherein the first and second substrates are approximately the same size.

34. A heatable vehicle window comprising:

first and second substrates laminated to one another via a polymer inclusive interlayer, wherein a heatable layer and at least first and second conductive bus bars are provided between the substrates;

wherein a terminal connector is electrically connected to at least one of the bus bars in a gap between the substrates;

wherein said gap is defined by a notch or cut-out in said polymer inclusive interlayer; and wherein a conductor of said terminal connector is soldered or welded to at least one of the bus bars in said gap, and wherein said conductor is flexible and overlaps itself in said gap.

35. The heatable vehicle window of claim 31, wherein said notch or cut-out is in the approximate shape of one of a rectangular, triangle, half-circle, or oval.

36. A heatable vehicle window comprising:

first and second glass substrates laminated to one another via a polymer inclusive interlayer, wherein a heatable layer and at least first and second conductive bus bars are provided between the substrates, said first and second bus bars being located directly on and contacting the first glass substrate thereby being at least partially located between the first glass substrate and the polymer inclusive interlayer which is adjacent thereto;

wherein a notch or cut-out is defined in a peripheral portion of said polymer inclusive interlayer; and wherein a position of said notch or cut-out defined in said interlayer corresponds to a position of a terminal portion of at least one of said bus bars so that following lamination of the first and second substrates to one another said terminal portion of said at least one bus bar is exposed and accessible via a gap provided between the first and second substrates at said notch or cut-out defined in said interlayer.

37. The heatable vehicle window of claim 36, wherein a terminal connector is electrically connected to the terminal portion of the at least one bus bar in said gap.

38. A method of making a vehicle window, the method comprising:

forming at least one conductive member so as to be supported by a first substrate;

laminating the first substrate to a second substrate via a polymer inclusive interlayer so that the conductive member is at least partially provided between the first and second substrates, the interlayer having at least one notch or cut-out defined therein; and after said laminating, inserting at least a portion of a terminal connector into a gap located between the substrates in order to electrically connect the terminal connector to the conductive member at an area corresponding to said at least one notch or cut-out defined in the interlayer.

39. The method of claim 38, wherein the conductive member comprises one of a bus bar for a heatable window, and an antenna member.

* * * * *